(12) United States Patent
Campbell

(10) Patent No.: US 11,030,579 B1
(45) Date of Patent: Jun. 8, 2021

(54) METHOD AND SYSTEM FOR INCIDENT COMMUNICATION

(71) Applicant: JPMorgan Chase Bank, N.A., New York, NY (US)

(72) Inventor: Lynsey A. Campbell, Glasgow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 1147 days.

(21) Appl. No.: 14/331,790

(22) Filed: Jul. 15, 2014

Related U.S. Application Data

(60) Provisional application No. 61/846,313, filed on Jul. 15, 2013.

(51) Int. Cl.
   *G06Q 10/10* (2012.01)

(52) U.S. Cl.
   CPC .................................. *G06Q 10/10* (2013.01)

(58) Field of Classification Search
   CPC .............................. G06Q 10/10; H04L 51/046
   USPC ......................................................... 705/345
   See application file for complete search history.

(56) References Cited

U.S. PATENT DOCUMENTS

| | | | |
|---|---|---|---|
| 5,278,539 A | 1/1994 | Lauterbach et al. |
| 5,991,881 A | 11/1999 | Conklin et al. |
| 7,159,237 B2 | 1/2007 | Schneier et al. |
| 7,233,781 B2 | 6/2007 | Hunter et al. |
| 7,277,018 B2 | 10/2007 | Reyes et al. |
| 7,283,045 B1 | 10/2007 | Manz |
| 7,482,952 B2 | 1/2009 | Horstemeyer |
| 7,515,041 B2 | 4/2009 | Eisold et al. |
| 7,602,281 B2 | 10/2009 | Manz et al. |
| 7,707,637 B2 | 4/2010 | Kaler et al. |
| 7,764,185 B1 | 7/2010 | Manz et al. |
| 7,805,369 B2 | 9/2010 | Song et al. |
| 7,813,947 B2 | 10/2010 | DeAngelis et al. |
| 7,882,031 B2 | 2/2011 | Song et al. |
| 7,899,722 B1 | 3/2011 | Lawrence et al. |
| 7,930,228 B1 | 4/2011 | Hawkins et al. |
| 7,961,095 B2 | 6/2011 | George et al. |
| 7,979,094 B2 | 7/2011 | Whattam |
| 8,108,914 B2 | 1/2012 | Hernoud et al. |
| 8,140,415 B2 | 3/2012 | Lawrence et al. |
| 8,185,618 B2 | 5/2012 | Beliles, Jr. et al. |

(Continued)

OTHER PUBLICATIONS

Assets, Threats. Vulnerabilities: Discovery and Analysis—a comprehensive approach to Enterprise Risk Management, Symantec Corporation, enterprisesecurity. symantec. com/PDF/AxentPDFs/RiskMgmt. pdf Sep. 12, 2007.

*Primary Examiner* — Jerry O'Connor
*Assistant Examiner* — James Webb
(74) *Attorney, Agent, or Firm* — Hunton Andrews Kurth LLP

(57) ABSTRACT

An embodiment of the present invention is directed to a computer implemented method and system for managing incident notification. The system uses bi-directional (two way) communication of incidents to multiple users where the system gives them substantial control over the information they need and want. An embodiment of the present invention may be aware of whether they have received and consumed that information thereby enabling those users to rapidly engage in additional communication paths (e.g., chat sessions, phone/video sessions, etc.) as needed to inform them and solicit their input into problem solving.

15 Claims, 9 Drawing Sheets

(56) References Cited

U.S. PATENT DOCUMENTS

| | | |
|---|---|---|
| 8,260,638 B2 | 9/2012 | McNamee et al. |
| 8,340,628 B2 | 12/2012 | Taylor et al. |
| 8,543,444 B2 | 9/2013 | Agle et al. |
| 8,589,260 B2 | 11/2013 | Chambers et al. |
| 8,626,645 B1 | 1/2014 | Lazerson et al. |
| 8,660,240 B2 | 2/2014 | Kirchmeier et al. |
| 2002/0156848 A1* | 10/2002 | Grouse ............. G06Q 30/0212 709/204 |
| 2003/0131011 A1 | 7/2003 | Haunschild et al. |
| 2003/0217036 A1 | 11/2003 | Haunschild et al. |
| 2005/0065904 A1 | 3/2005 | DeAngelis et al. |
| 2005/0065941 A1 | 3/2005 | DeAngelis et al. |
| 2005/0219044 A1 | 10/2005 | Douglass et al. |
| 2006/0064305 A1* | 3/2006 | Alonso ................. G06Q 10/06 705/314 |
| 2006/0168592 A1 | 7/2006 | Andrews et al. |
| 2006/0173759 A1 | 8/2006 | Green et al. |
| 2008/0015913 A1 | 1/2008 | Courtney et al. |
| 2009/0055915 A1* | 2/2009 | Piliouras ................ G06F 21/41 726/8 |
| 2009/0063234 A1 | 3/2009 | Refsland et al. |
| 2010/0223566 A1* | 9/2010 | Holmes ................ G06F 3/0481 715/764 |
| 2011/0087510 A1* | 4/2011 | Putra ..................... G06Q 10/00 705/7.13 |
| 2011/0087576 A1 | 4/2011 | Song et al. |
| 2011/0131125 A1 | 6/2011 | Lawrence et al. |
| 2012/0256745 A1* | 10/2012 | Piett ...................... G06Q 30/02 340/540 |
| 2012/0303525 A1 | 11/2012 | Sahadevan |
| 2013/0086507 A1* | 4/2013 | Poston ................. G06F 3/0483 715/777 |
| 2013/0097662 A1* | 4/2013 | Pearcy ................. G06F 21/577 726/1 |
| 2013/0290218 A1 | 10/2013 | Merwin et al. |
| 2014/0087780 A1 | 3/2014 | Abhyanker et al. |

\* cited by examiner

METHOD AND SYSTEM FOR INCIDENT COMMUNICATION

CROSS REFERENCE TO RELATED APPLICATION

This application claims priority to Provisional Application No. 61/846,313 filed on Jul. 15, 2013. The contents of this priority application are incorporated herein by reference in its entirety.

This application is related to U.S. patent application Ser. No. 13/934,772, filed Jul. 3, 2013, entitled "Method and System for Event, Security and Technology Incident Notification."

FIELD OF THE INVENTION

The present invention generally relates to a multi-platform technology for communication of incidents.

BACKGROUND OF THE INVENTION

Traditional notification systems use email, text messages and sometimes pre-recorded voicemails to a wide range of recipients. Such conventional systems provide a generic message to a mass group of subscribers, users, employees, etc. Most existing technology is unidirectional, i.e., broadcast of status, without awareness of whether the recipient wants to know or has actually received the message. Updates to a situation are provided by a new message. Generally, all the recipients receive the same message and have limited, if any, ability to monitor the status.

Other drawbacks may also be present.

SUMMARY OF THE INVENTION

Accordingly, one aspect of the invention is to address one or more of the drawbacks set forth above. According to an embodiment of the present invention, a method and system for managing incident notification comprises: receiving an electronic notice of an incident associated with an entity at an input of the computer; automatically classifying, using the computer, the incident into a category representative of a priority and a severity of the incident; providing, using the computer, information concerning the incident to a user interface accessible by a plurality of users via the network based on subscription information associated with each user; receiving, by the computer, user feedback data from the user interface concerning the incident; monitoring, using the computer, the incident to generate status information; and automatically updating the user interface of the computer based on the status information and the user feedback data concerning the incident.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
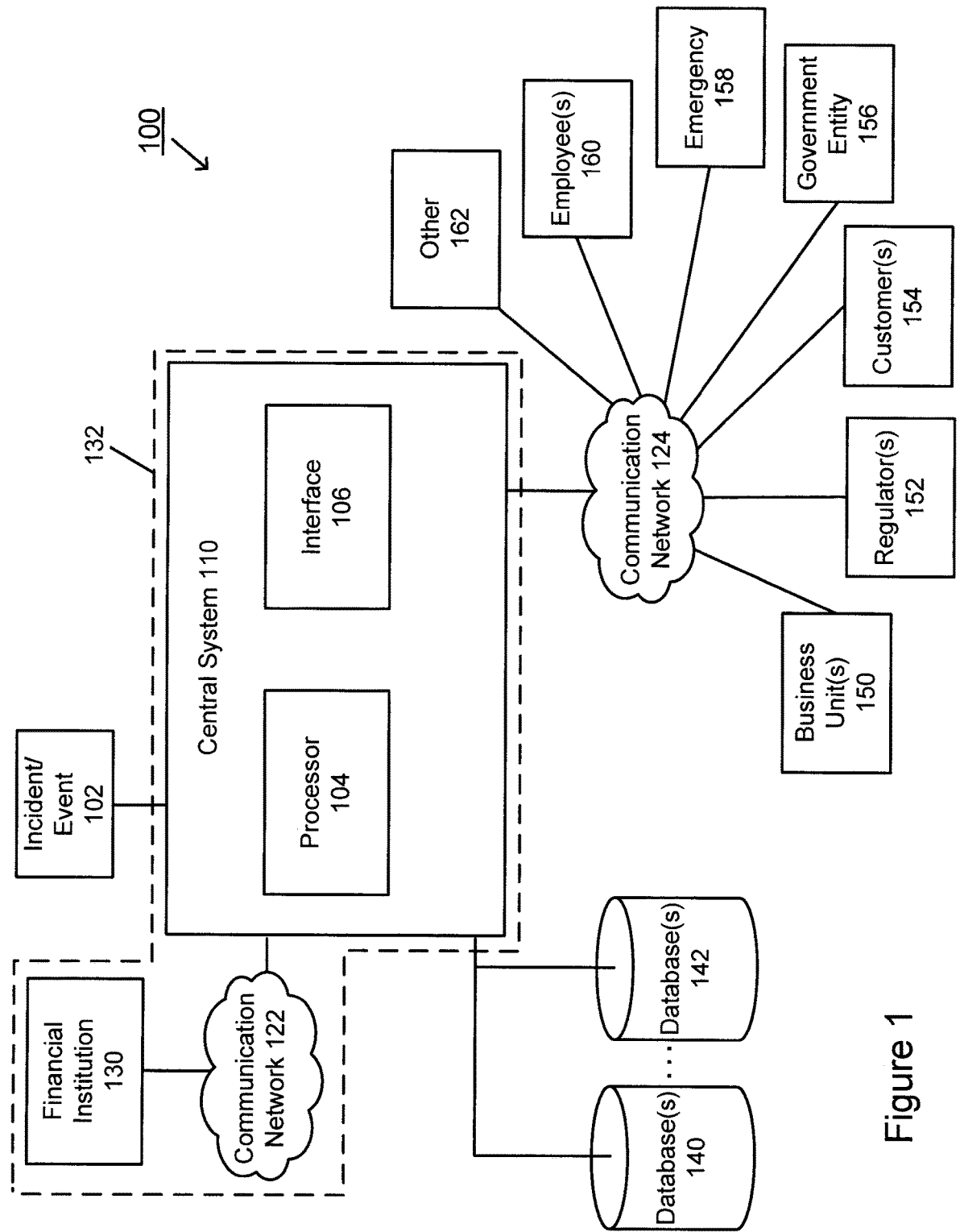
FIG. 1 is an exemplary diagram of a system for incident notification, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention provides an effective mechanism to accurately and timely inform employees and others about incident reports via an interactive interface using a mobile device (e.g., mobile phone, PDA, tablet, reader, etc.) and other devices (e.g., desktop device, processor, computing device, etc.). For example, an employees may access an interface to view updates and details concerning active and past incidents.

An embodiment of the present invention is directed to a central technology incident communication tool for corporate and other entities. Recognizing the ineffectiveness of email notifications, an embodiment of the present invention seeks to streamline incident communications. To this end, the system according to an embodiment of the present invention provides mobile alerting via push notification and messages. For example, the system may include an application ("app") on a mobile device, such as a mobile phone, for receiving alerts and/or a customized alert (e.g., vibrate, chime, etc.). The user may access the app on the mobile phone to view active alerts and corresponding status and details. Users may subscribe to incident communications by business unit, severity and/or other forms of personalization. Incidents may include technical issues, outages, weather related events (e.g., hurricane, storm), building closures, etc.

An embodiment of the present invention is directed to an innovative interface for data visualization. The initial dashboard provides main incident details and the ability to view additional information. Each incident may be displayed with various information, including (1) identifying information (e.g., location, time, type of incident, color code, category which may include P1S1, P2S2 where "P" represents priority and "S" represents severity), (2) descriptive information (e.g., an executive summary, impacted businesses/entities, technical summary, etc.) and/or (3) status information (e.g., resolvers, viewers, impacted groups, time to next update, etc.). Additional details may be provided for each incident where current and prior updates may be displayed. Communication functionality may include the ability to connect to a call center or incident bridge, join chat rooms and send notification to other employees, groups, etc. An embodiment of the present invention provides one-touch integration into audio/video conferences for each specific incident.

An embodiment of the present invention also provides a command center console to streamline the creation of incident communications. The command center console may manage some or all open incidents and also create/revise communications. The console may also provide reporting and analysis tools.

An embodiment of the present invention may also provide a geographic view that displays incidents relative to each other. Additional forms of customization may also be realized in terms of types of notifications, modes of alerts, etc.

While the detailed description is directed to an exemplary application involving incident notifications, the various embodiments of the invention may be applied to other scenarios and applications involving notification systems. Other applications may be applied in varying scope.

FIG. 1 is an exemplary diagram of a system 100 for incident notification, according to an embodiment of the present invention. A system 100 of an embodiment of the present invention may include a Central System 110, which may be stand alone, hosted by an entity, such as a financial institution, service provider, bank, etc. For example, Central System 110 may be affiliated or associated with a financial institution, bank and/or other entity with notification concerns. In an exemplary embodiment involving a financial institution such as 130, the financial institution may host or support the Central System 110. In this example, the application of the various features of an embodiment of the present invention may appear to be performed by financial institution, as a single consolidated unit, as shown by 132.

According to another example, Central System 110 may be separate and distinct from Financial Institution 130. For example, Financial Institution 130, or other entity, may communicate to Central System 110 via a network or other communication mechanism, as shown by 122. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

An embodiment of the present invention may operate for a single entity, as well as a community of entities. For example, a community of financial institutions may implement a central system for monitoring incidents that may affect similarly situated entities (e.g., regional banks, national banks, branch locations, conglomerate, business including affiliates and subsidiaries, etc.). According to another example, an entity may have a single system or multiple systems for various industries where each industry specific system may communicate with each other and/or other systems across entities and locations. Other architectures may be realized.

Central System 110 may access databases and/or other sources of information, represented by Databases 140, 142. Databases 140 and 142 may include data, such as incident reports, tracking data, points of contact, business units, regulators, requirements (e.g., message, timing, communication mode, etc.), historical data and/or other relevant data for notification and/or compliance. An embodiment of the present invention may use historical information to generate predictions and ensure or confirm that the right people (e.g., resolvers, etc.) are working on the incident. While each database is illustrated as a single database in the exemplary figure, the system may include multiple databases at the same location or separated through multiple locations. The databases may be further combined and/or separated. In addition, the databases may be supported by Financial Institution 130 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Central System 110 may communicate with various entities, including Business Unit(s) 150, Regulator(s) 152, Customer(s) 154, Government Entity 156, Emergency 158, Employee(s) 160 and/or Other Entities 162. For example, an embodiment of the present invention may communicate to Emergency 158, including police, law enforcement, FBI, terrorism bureaus, government entities, cyber security teams, Department of Justice, Department of Homeland Security, national threat assessment teams, secret service units, and/or other entities. Communication may be provided by Communication Network 122 and 124 and/or other communication mechanism. In addition, Central System 110 may have access to other sources of data and/or data feeds that identify other metrics and/or information that may be relevant for identifying and communicating incident notification in accordance with an embodiment of the present invention.

As shown in FIG. 1, an incident/event 102 may be detected by Processor 104. Notice of the event may be submitted automatically or manually. The event may be an external event or internal event. For example, an internal event may include a security breach from within the company, e.g., an employee or contractor stealing data or property, misappropriation of funds, insider trading, etc. Others examples may include loss of data, mishandling of data, loss of storage medium and/or other equipment, etc. An external event may be a cyber-attack. The event may also be weather related (e.g., natural disaster, hurricane, severe storm, drought etc.). The event may also be a physical event, such as damage to a central unit, etc. Other events or incidents may be identified.

Processor 104 may then classify the incident or otherwise assess the type and/or the severity of the incident. For example, a category may be assigned to the event. The category may represent priority and severity. Priority may capture the importance of the incident and that the incident needs to be resolved quickly. Severity may represent how deeply the incident impacts the business. This may also refer to how widespread the incident is. Other categories and representations may be used based on the business and/or other needs.

A system of an embodiment of the present invention may classify incidents according to sensitivity and may further restrict sensitive issue notifications to those with appropriate need-to-know credentials, e.g., non-public reputational information on public companies, or sensitive civilian or military incidents. Processor 104 may then generate a message pertaining to the event and also identify recipients and any requirements for notification of the event.

Processor 104 may provide the message concerning the incident via Interface 106. Based on the user's subscription and/or other preferences, the user may be notified that an incident has been uploaded to the interface. Various other recipients may be informed. As shown in FIG. 1, other recipients may include Business Unit(s) 150, Regulator(s) 152, Customer(s) 154, Government Entity 156, Emergency 158, Employee(s) 160 and/or other recipients represented by 162, which may include news feeds, news organizations, public relations group, media outlets, etc. The communication may be transmitted automatically, periodically and/or the communication may be initiated by an authorized user.

An embodiment of the present invention may also determine whether a modified version of the message (e.g., more detailed; less detailed) should be sent or provided to another group of recipients (e.g., management, resolvers, outside entities, government entities, etc.). The determination may be further based on subject matter expertise, priority, availability and/or other factor(s). If the severity is determined to be high (or above a threshold), the system may identify the appropriate regulators, regulatory requirements and time period for a notification.

Communications, acknowledgements and incident details may be tracked and managed by Central System 110. Each point of communication may be logged into the system by time, description of the communication, applicable contact and corresponding acknowledgement. A system user may run reports, refine response plans and predict future events based on historical data.

An embodiment of the present invention may also manage acknowledgements from the recipients. Moreover, there may be instances where the recipients and the entities may need to communicate further. Also, various forms of data may be shared, exchanged and/or otherwise transmitted between the entity and recipients. Data may include documents, images, photos, audio, video, maps, static data, interactive data, etc. Interface 106 may provide status updates, questions and answers, etc. For an event that is long term or otherwise requires additional follow-up, Interface 106 may provide a common forum where current status information may be provided. Other connections to external sources of data may be realized. Also, security measures (e.g., encryption, password, certificate, etc.) may be applied to protect communications and sensitive data.

Figure 2:
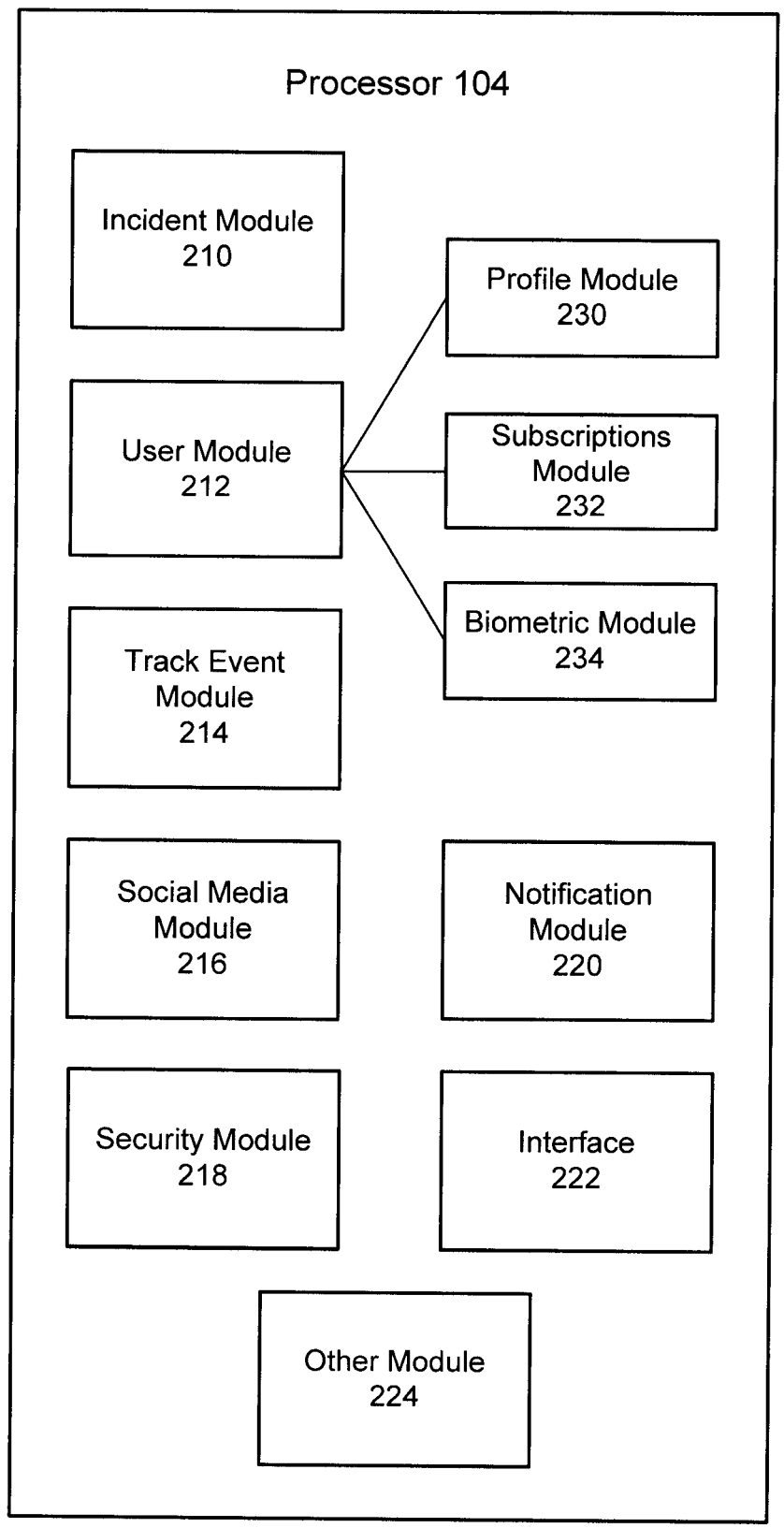
FIG. 2 is an exemplary detailed diagram of a processor for incident notification, according to an embodiment of the present invention.

FIG. 2 is an exemplary detailed diagram of a processor for managing incident notification, according to an embodiment of the present invention. For example, Processor 104 may include various modules and interfaces for analyzing data regarding an incident, compiling relevant information from various sources and communicating status information in a timely and efficient manner, according to an embodiment of the present invention. Processor 104 may include Incident Module 210, User Module 212, Track Event Module 214, Social Media Module 216, Security Module 218, Notification Module 220, Interface 222 and/or other modules, interfaces and/or processors, as represented by Other Module 224. The modules may include additional functionality. For example, User Module 212 may include sub-modules, such as Profile Module 230, Subscriptions Module 232 and Biometric Module 234. While a single illustrative block, module, sub-module or component is shown, these illustrative blocks, modules, sub-modules or components may be multiplied for various applications or different application environments. In addition, the modules, sub-modules and/or components may be further combined into a consolidated unit. Other architectures may be realized. The modules, sub-modules and/or components may be further duplicated, combined and/or separated across multiple systems at local and/or remote locations.

At Incident Module 210, a notice of an event or incident may be reported to the system. The notice may be identified automatically and/or submitted manually. The system may detect events and automatically input an incident. The event or incident may include a security breach, a cyber-attack, a natural disaster, an impending storm and/or other event that may threaten security or pose any varying degree of threat or concern to an entity, directly and/or indirectly. Events may also include robbery, threat of robbery, financial loss, loss of data, loss of equipment, etc. Also, data-feeds to external sources may provide a source of incidents, e.g., severe weather alerts, power outages, closed roads and building access, security breaches at related or associated entities, etc.

User Module 212 may include information about a user, group of users, teams, units, companies, etc. User Module 212 may further include Profile Module 230, Subscriptions Module 232, Biometric Module 234 and other modules.

Profile Module 230 may manage user profile information, including demographic information, employment information, contact information, geographic information, etc. Profile information may also include device specific information, e.g., type, model, screen shape and size.

Subscriptions Module 232 may also include subscription information for each user, group of user, type of user, etc. Subscriptions Module 232 may manage user subscription information concerning the type of incident notifications the user is scheduled to receive. There are some incidents that may qualify as universal notifications and other incidents that should be restricted to certain users based on confidential and proprietary information. Other restrictions and considerations may be applied.

The subscription model of an embodiment of the present invention enables the user to express their interest in seeing specific importance levels of events or incidents across a broad range of business functions. The system may—by default—understand who the user is, and may infer a basic set or responsibilities (e.g., senior executives would naturally be interested in summary information about the businesses they are responsible for). Users may configure the system to flexibly notify them on changes in importance of events, and so on. An embodiment of the present invention may use knowledge of an individual's responsibilities in a company or government hierarchy to automatically determine subscriptions for notifications.

Biometric Module 234 may manage user biometric information for identification and security purposes. Users may access the interface via multiple devices, each of which may require a separate biometric and security protocol.

At Track Event Module 214, communications, acknowledgements and incident details may be tracked and managed by the central system. Each point of communication may be logged into the system by time, description of the communication, applicable contact and corresponding acknowledgement. A system user may run reports, refine response plans and predict future events based on historical data. Any revisions, modifications, corrections, errors and/or other changes may be tracked. This information may also be used to refine the notification and/or communication functions of the system.

The tracked information may be provided to the interface and periodically updated with new and current information. Historical tracking information may be used to provide predictors using past success and failures. A system of an embodiment of the present invention may track prior history of resolution of events and further use that knowledge to highlight engineers who are skilled in the resolution of similar incidents.

Social Media Module 216 may access data and other details from social networking sites, blogs, microblogging sites, newsfeeds, chat sessions of clients and users. Social media technologies may be accessible to provide updates. For example, an embodiment of the present invention may monitor internal as well as external social media to ascertain an early indication of potential incidents, and detect the population impacted by such incidents.

An embodiment of the present invention may tap into social media services, either public or those within a company's internal social media streams such as email, Instant Messenger, blogs, chat sessions, etc. These streams may provide an early indication of problems in the environment before they have been formulated into actual incidents. Moreover, they may give an early and continuous indication of the impacted population of an incident. For instance, if a major application failure is being experienced, numerous users will be chatting with each other via social media. Similarly, an embodiment of the present invention may provide rapid, raw updates to incidents via social media technologies, for those users who want rapid updates in a less formal setting.

Machine-generated status information may be used to provide color heat-maps giving rapid and detailed data. For example, entirely technology-based monitoring systems which normally detect anomalies and failures, when aggregated and matched to incidents, may give a measure of the dimension and impact of incidents (a "heat map" of impact).

Security Module 218 provides security features for the information provided on the Interface. The interface on mobile devices and other devices may display proprietary and confidential information. Accordingly, an embodiment of the present invention may support an obfuscation of important details when the security of the device is in question. For example, this may involve situations where the user has not yet authenticated, or has left the device idle for an extended period of time. An embodiment of the present invention may implement an encrypted local cache of data on mobile devices, which may be secured using over-the-wire authentication credentials, for example. This cache may be destroyed in the event of activities (e.g., sufficient failed password attempts, etc.) that indicate the device may be at risk of compromise. In addition, an embodiment of the present invention may employ biometric recognition to uniquely map users to their interests (e.g., subscriptions, preferences, etc.)

Notification Module 220 may refer to providing incident information to the interface. This may be based on user subscription data. In addition, an embodiment of the present invention may also transmit messages to one or more other users or types of users. For example, an incident notification may be provided to the interface and a specific message may be also sent to a senior level executive and/or an external entity (e.g., governmental entity, regulator, etc.).

An embodiment of the present invention may have an awareness of key attributes of incidents. The attributes may be industry specific. For example, some incidents in financial services may require notifying a regulator if a particular activity is not completed by a certain time. An embodiment of the present invention may communicate to users these key characteristics visually and filter such attributes in subscriptions.

An embodiment of the present invention may have an awareness of client impact, and therefore provide senior executives a filtered view limited to critical incidents that impact important clients. Other restrictions and filters may be applied.

According to an embodiment of the present invention, the system concept of an "Incident Cloud" may provide varying attitudes, volumes, and accuracy of data, shown based on the users' subscription desire. An "Incident Cloud" may represent the amorphous nature of elements of an incident, from high level information (e.g., high altitude, summary information, etc.) to low level detail (e.g., low altitude, access to all information, etc.) and allowing the user to select a preference for detail or summary, across any businesses or functions the user is interested in. For example, senior executives may wish to see only clearly crafted, precise statements without jargon. Business leads may wish to see more rapid, but vetted and confirmed data on business impact and expected resolution times. Accordingly, display options may be customized based on the user, type of user, and/or user preferences. In addition, an embodiment of the present invention may identify recipients, such as appropriate regulators, regulatory requirements and/or time period for a notification.

According to an embodiment of the present invention, a system may customize notification of incidents to management hierarchies and/or populations based on feedback from mobile devices assessing the attentiveness of responders. For example, an embodiment of the present invention may engage additional people if the original target populations are not paying attention as indicated by interaction with the user interface, lack of movement of the mobile devices as determined by accelerometers, etc.

An embodiment of the present invention is directed to an innovative interface, as represented by Interface 222. The interface provides communication bi-directionally between the user and one or more information sources. The specific details of the interface, described below, provide key features of an immersive incident tracking experience. Users may view details of the incident from various perspectives, e.g., a business perspective, a technology perspective, etc., and various levels of detail or summary. In addition, users may observe who else is also watching the incident. The implication is that if subordinates in the organization are paying attention, senior leaders are comfortable the situation is being handled effectively. Also, users may see who is actually working on the problems. Key specialists who have solved problems successfully in the past may be highlighted, so it is visually clear whether that the right people are engaged in the problem or not.

An embodiment of the present invention may be aware of how long previous issues took to resolve. This information may be used as a predictor by incident type of expected resolution. Because an embodiment of the present invention has an active awareness of who is watching incidents, it may facilitate decisions on further steps of notification, and/or escalation to other teams or people. Therefore, if a responsible party is not paying attention, the automated system may take specific action. This allows the system to ascertain whether the responsible parties are engaged. In addition, such features as cameras and/or microphones and/or accelerometers may be used to similarly assess the degree of engagement of the user and factor that into attention estimates.

The interface may further provide a visual indicator of the timeline and history of an incident, communicating how long an incident has been active, when the next update can be expected, and what progress was made at that point in the timeline.

Users may join additional multimedia streams (e.g., chat sessions, audio conferences, etc.) through an icon, such as one-touch interface, that attaches the user directly to the conversation about that specific incident. Users may also peer-to-peer message with other users of the interface in the context of the incident.

Figure 3:
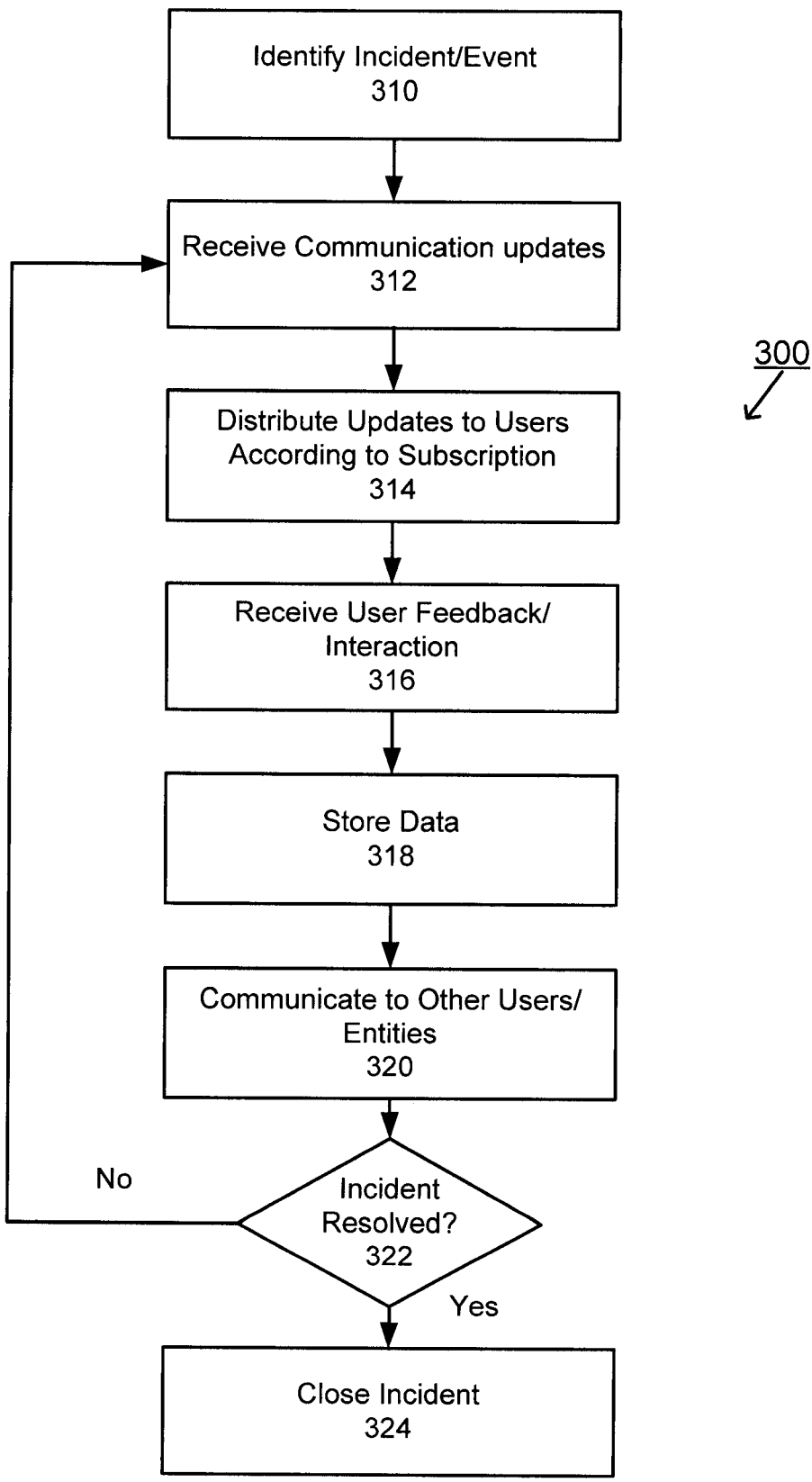
FIG. 3 is an exemplary flowchart illustrating a method for incident notification, according to an embodiment of the present invention.

FIG. 3 is an exemplary flowchart illustrating a method 300 for managing incident notification, according to an embodiment of the present invention. At step 310, an event or incident may be identified. At step 312, communication updates concerning the incident may be received. At step 314, updates may be distributed to the users according to the user's subscription data. At step 316, user feedback and/or other interaction may be received. At step 318, the incident and monitored information may be stored. At step 320, information may be communicated to other users. At step 322, it may be determined whether the incident is resolved or not. If the incident is not resolved, communication updates may be received at 312. If the incident is resolved, the incident may be closed at 324. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, an incident may be identified. For example, the incident may be classified or categorized.

At step 312, communication updates concerning the incident may be received. The incident may be uploaded to the interface. Recipients may receive an alert that a new incident has been received where the recipients may access the interface. Recipients may receive a summary notification of the incident with a link to the information. Updates may be provided to the interface, including details concerning resolvers and viewers of the incident via the interface. Other actions and events may be identified and provided.

At step 314, updates may be distributed to the users according to the user's subscription data. For example, a user may subscribe to a particular business unit or type of event notification. Also, for emergency type of events, all recipients may be identified. For sensitive events, the notification may be limited to top executives and/or management level.

At step 316, user feedback and/or other interaction may be received. For example, the user may request more information. The user may contribute to a chat room or other communication. For example, an embodiment of the present invention provides one-touch integration into audio/video conferences for each specific incident. The user's engagement level (e.g., user activity, interaction, etc.) may be identified.

At step 318, the incident and monitored information may be stored. The system of an embodiment of the present invention may learn from prior incidents and determine if any trends or precursor events occurred to better predict and categorize events. According to an exemplary embodiment, the system may track prior history of resolution of events and use that information to identify individuals or groups who are relevant to the incident, such as engineers who are skilled in the resolution of similar incidents.

At step 320, information may be communicated to other users. Other users may also include external entities, executives, contractors, etc.

At step 322, it may be determined whether the incident is resolved or not. If the incident is not resolved, communication updates may be received at 312. If the incident is resolved, the incident may be closed at 324.

Figure 4:
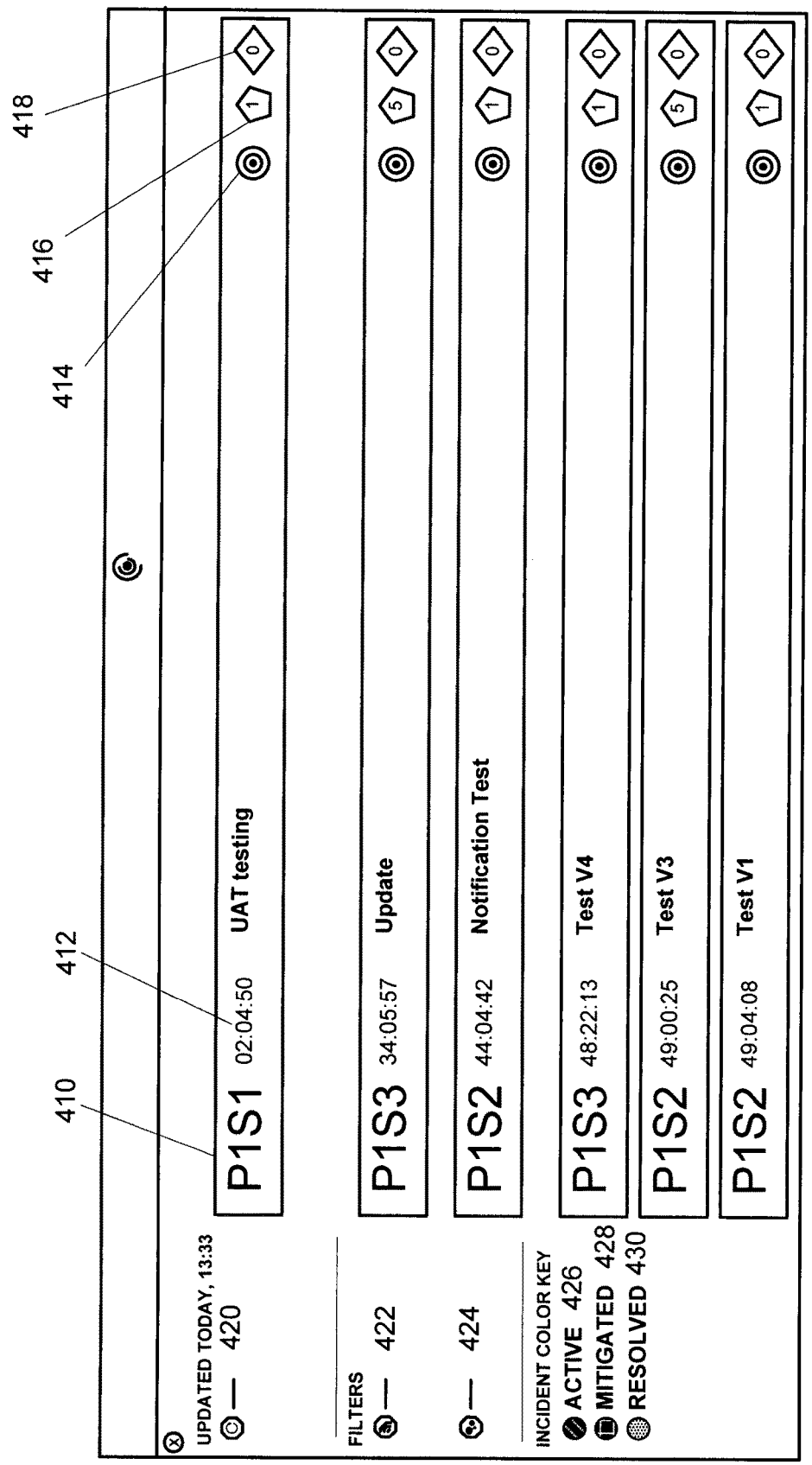
FIG. 4 is an exemplary interface illustrating an incident dashboard, according to an embodiment of the present invention.

FIG. 4 is an exemplary interface illustrating an incident dashboard, according to an embodiment of the present invention. FIG. 4 provides a listing of active incidents. In this example, each incident is identified by a category, as shown by 410, such as P1S1, P2S2 where "P" represents priority and "S" represents severity. The numbers may represent an intensity, such as high, middle, low, etc. In this example, P1 may be considered the most significant impact while P3 is of lower importance. Other symbols and/or annotations may be used. The time indicator 412 may represent how much time has elapsed since the detection of the incident. In this example, the most recent incident is displayed on top. Other options may be provided, such as displaying incident by shortest time to resolve, longest time to resolve, oldest incident, etc. A recent status may be shown as well. Other information or annotation may be provided to convey status and/or other information related to the incident. Additional details may be provided by activating a "more details" option at 414. Icon 416 represents the number of resolvers working on the incident. Icon 418 represents the number of users viewing the incident via the interface. The numbers may represent current resolves or current viewers. The numbers may also represent total number of resolves or viewers.

A manual refresh 420 may provide the user the ability to manually refresh the incident dashboard to display updated information. Filters may be displayed for subscribed incidents 422 or all incidents 424. An incident color key may be provided, active in a first color (shown by 426), mitigated in a second color (shown by 428) and resolved in a third color (shown by 430). Other icons, graphics, symbols and/or animations may be used to convey status and/or other characteristic.

Figure 5:
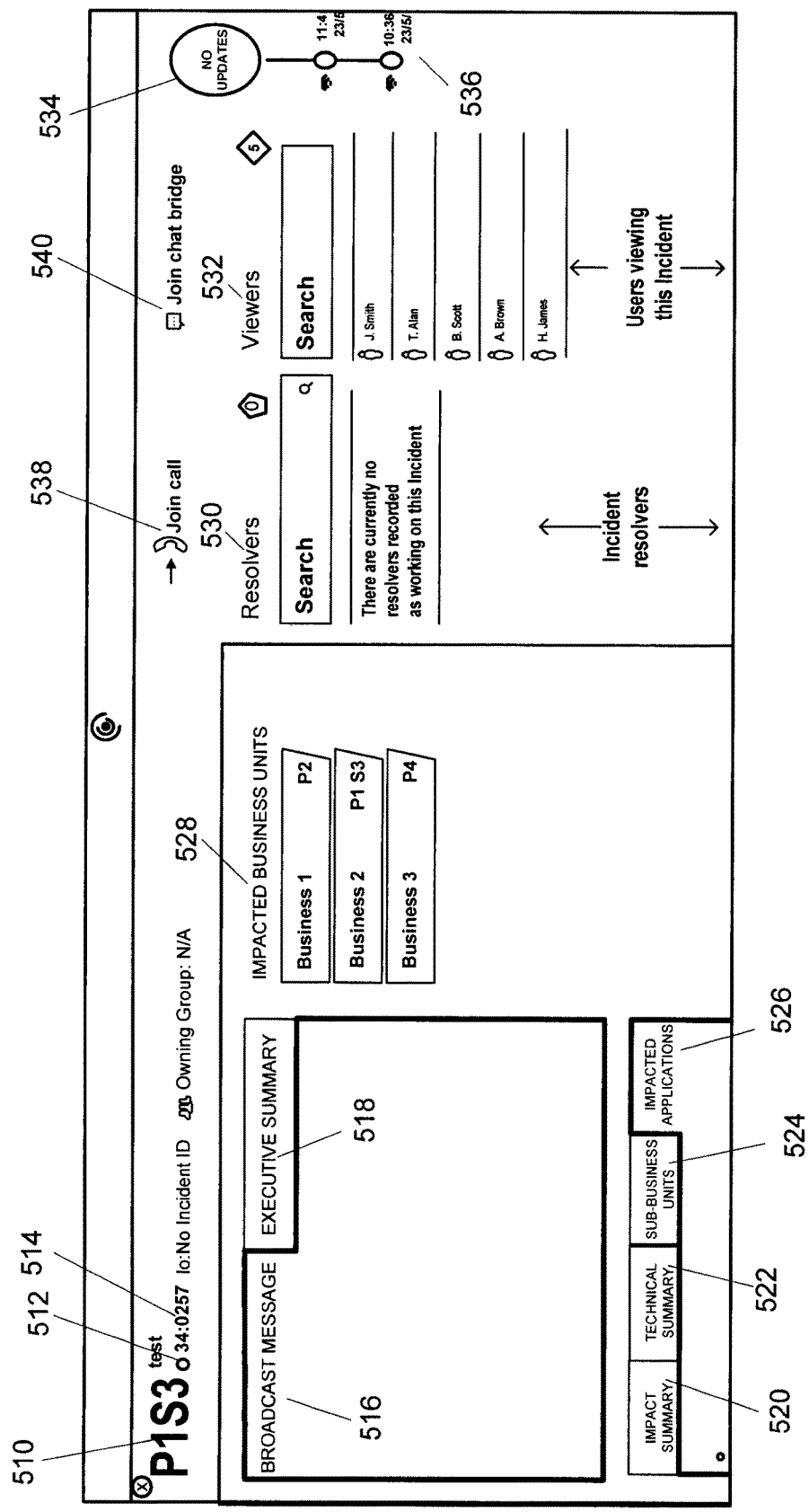
FIG. 5 is an exemplary interface illustrating an incident view, according to an embodiment of the present invention.

FIG. 5 is an exemplary interface illustrating an incident view, according to an embodiment of the present invention. This interface provides details for a specific incident, identified here by P1S3 (shown by 510). Incident status may be illustrated by a color coded icon, at 512. Other graphics may be used. The time elapsed 514 since the initial detection may be displayed. Various messages may be associated with a particular incident. As shown in FIG. 5, broadcast message 516 may display a message that was sent to all users. Executive summary 518 may include a high level summary regarding the incident. Other levels of detail may be provided based on the user's role, permissions and/or preferences. Also, additional details may be provided as shown by Impact Summary 520, Technical Summary 522, Sub Business Units 524, and Impacted Applications 526. Details regarding impacted business units may be shown at 528. As shown in this example, various business units may be shown as being impacted along with an associated level of severity or intensity, as shown by P2, P1S3 and P4, respectively. For each incident, the number and identify of resolvers may be displayed at 530. In this example, no resolvers are recorded. In another example, a listing of the resolvers may be displayed, which may include name, contact information, status, etc. In addition, viewers of the incident via the interface may be shown at 532. A user may further search for a particular resolver and/or viewer, as indicated by the respective search boxes. Update status may be graphically displayed at 534. Most recent updates may be graphically displayed in a timeline manner, shown by 536, with past updates indicated on the timeline.

Other communication options may be provided, as shown by Join Call 538 and Join Chat Bridge 540. By activating a communication option, the user is automatically inserted into a current call or chat regarding the incident.

Figure 6:
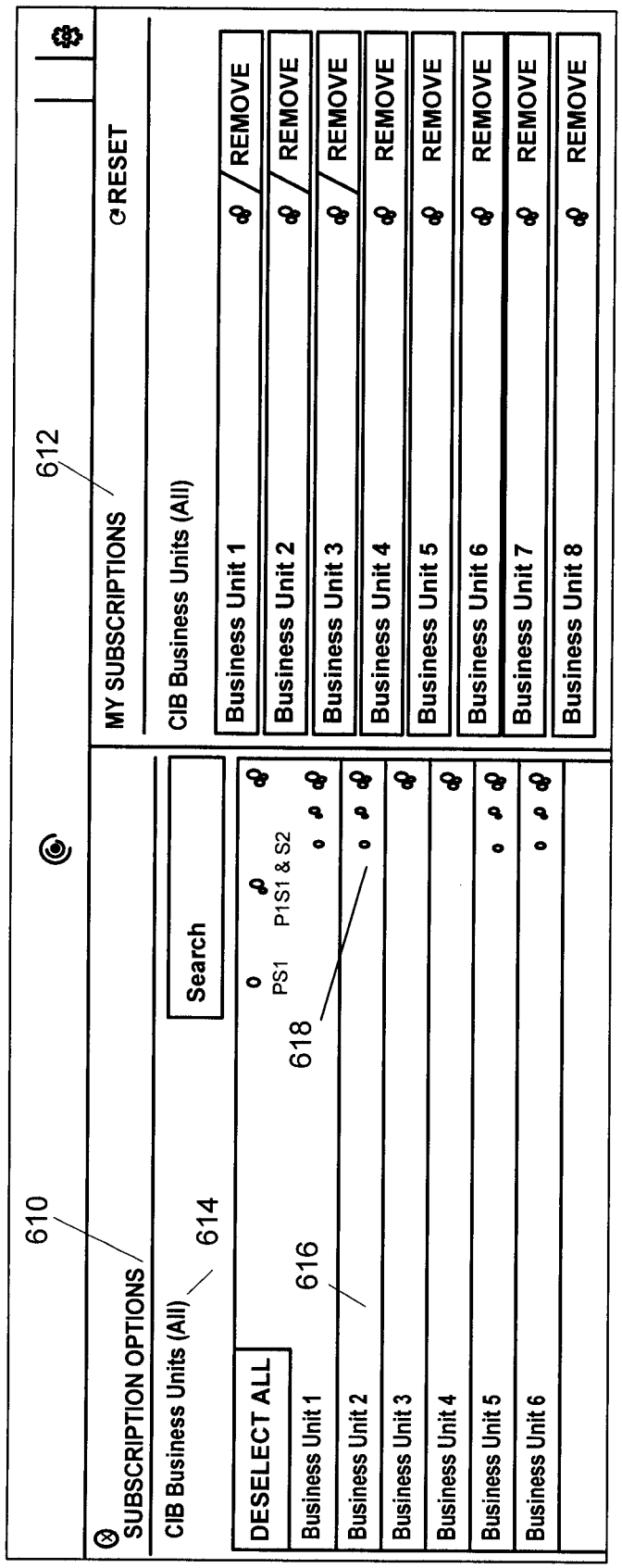
FIG. 6 is an exemplary interface illustrating a subscription view, according to an embodiment of the present invention.

FIG. 6 is an exemplary interface illustrating a subscription view, according to an embodiment of the present invention. FIG. 6 illustrates a Subscription Options view 610 and a My Subscriptions view 612. The user is able to select and/or fine tune the types of notifications that the user will receive upon an incident, event or other occurrence. In this example, a user may select one or more various subscription options based on business unit, shown at 614. The user may select a business unit (or other category or selection) (as shown by 616) and view individual row severities, at 618. In addition, a user may set severity preferences across selected business units. My Subscriptions 612 view may display the user's currently selected subscriptions.

Figure 7:
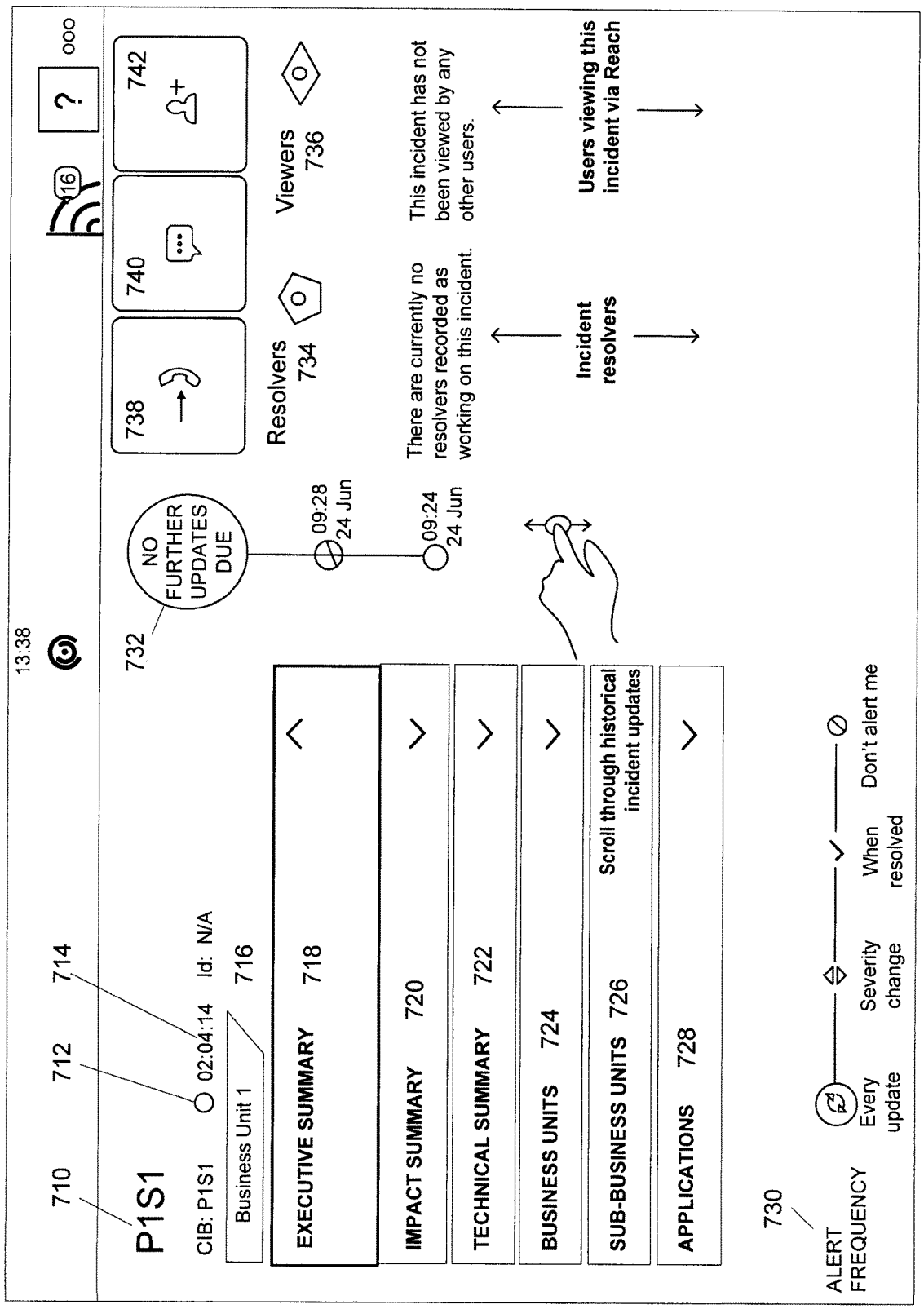
FIG. 7 is an exemplary interface illustrating an interactive interface, according to an embodiment of the present invention.

FIG. 7 is an exemplary interface illustrating an interactive interface, according to an embodiment of the present invention. FIG. 7 illustrates a view available to a user on any desktop or mobile device. The features of the embodiments of the present invention may be available via a mobile application and/or a web application. A user may view details concerning a particular incident, identified as P1S1, shown at 710. In this example, a status indicator 712 and time elapsed 714 may be shown. Impacted business units may be shown at 716. Other categories may be identified depending on the business, user preferences, etc. An executive summary regarding the incident may be shown at 718. Other information regarding the incident may be displayed at Impact Summary 720, Technical Summary 722, Business Units 724, Sub-Business Units 726, Applications 728, etc.

Alert frequency may be modified for the particular incident at 730. Some options may include Every Update, Severity Change, When Resolved and Don't Alert Me. Other triggers and/or conditions may be applied.

Update information may be graphically displayed at 732. A maximum time until the next update may be displayed. Recent updates may be shown in a timeline (e.g., vertical timeline). By activating a node, additional information regarding that particular update may be displayed to the user.

Icon 734 represents the number of resolvers working on the incident. Icon 736 represents the number of users viewing the incident via the interface. The numbers may represent current resolves or current viewers. The numbers may also represent total number of resolves or viewers. Names (or other identifiers) for each may be displayed.

Communication options may be provided, as shown by Join Call 738, Join Chat Bridge 740 and Notify Another User 742. By activating a communication option, the user is automatically inserted into a current call or chat regarding the incident. Other communication options may be provided.

Figure 8:
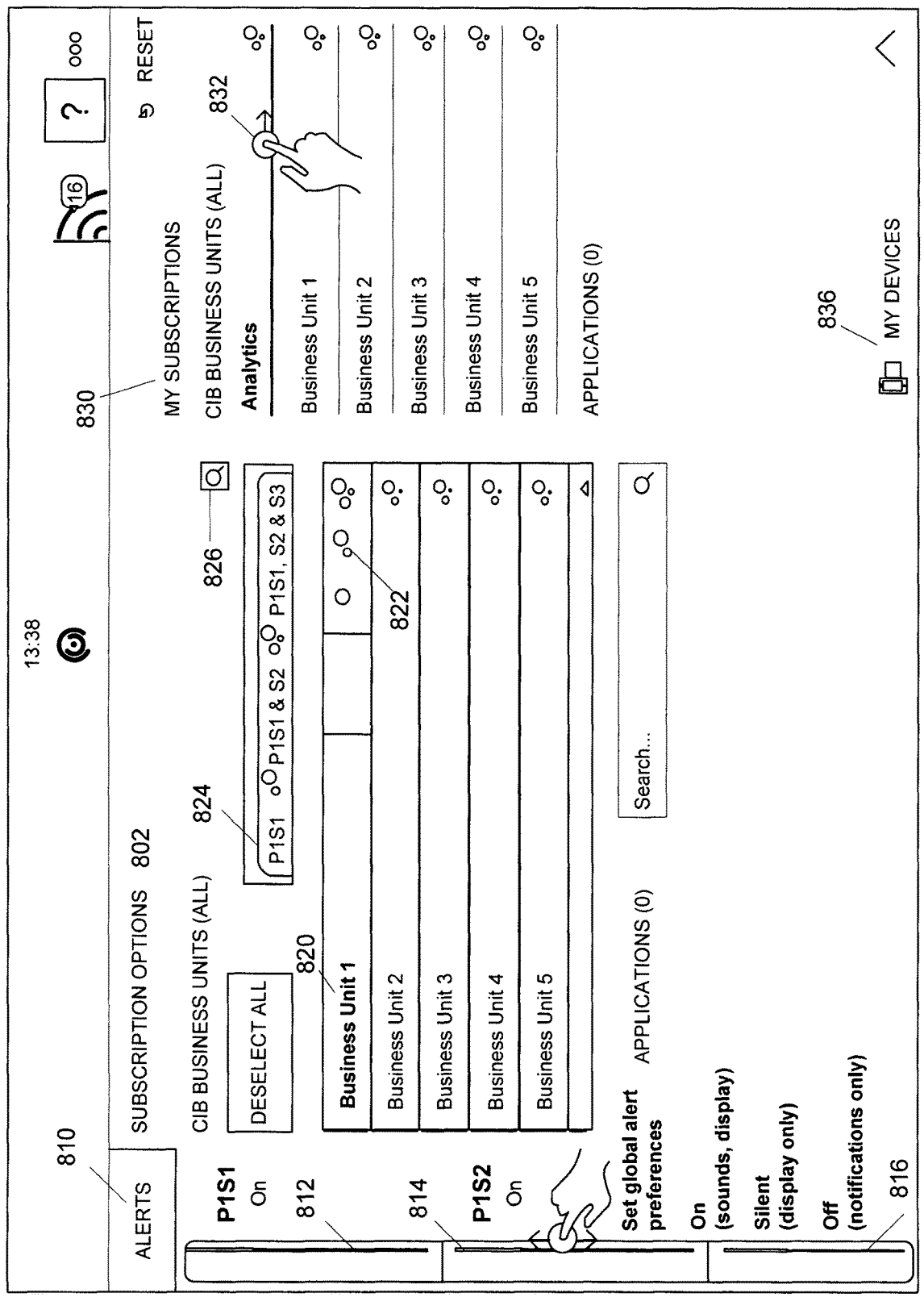
FIG. 8 is an exemplary interface illustrating subscription options, according to an embodiment of the present invention.

FIG. 8 is an exemplary interface illustrating subscription options, according to an embodiment of the present invention. As shown in FIG. 8, an alerts view 810 may provide customization options for the user. For each incident or type of incident, a user may customize the alert by sliding an interface, such as a bar up or down, as shown by 812, 814 and 816. By doing so, the user is selecting an alert preference, e.g., sound, display, silent, display only, notifications via the dashboard, etc.

FIG. 8 also provides details regarding subscription options 802. A user may tap (or otherwise select) a business unit (or other category) to add to subscriptions, as shown by 820. The user may also set a severity preference across chosen business units, as shown by 824. The user may further search for a particular business unit or type of business unit, at 826. The user may also set individual row severities at 822. FIG. 8 further provides details concerning a user's subscriptions via a My Subscriptions view 830. In this example, the user has subscribed to a plurality of business units. The user may remove business units by sliding the particular unit, at shown by 832. An embodiment of the present invention may employ other interactions, such as specific mobile platform gestures such as an "off-screen flick" to remove subscriptions for uninteresting information.

A reset button provides the ability to reset subscriptions to default subscriptions. The user may also subscribe to applications. Subscription to applications may refer to the user expressing the desire to see any incidents that impact one or more particular business applications in this context. More generally, this may be considered as watching technology functions at a granular level if desired, or other functions in other organizations of other types.

Finally, the user may view device specifics, as shown by 836. In addition, an embodiment of the present invention may employ an accelerometer and tilt sensors on a mobile device to express a level of detail that fits appropriately within the aspect ratio and capacity of the screen.

Figure 9:
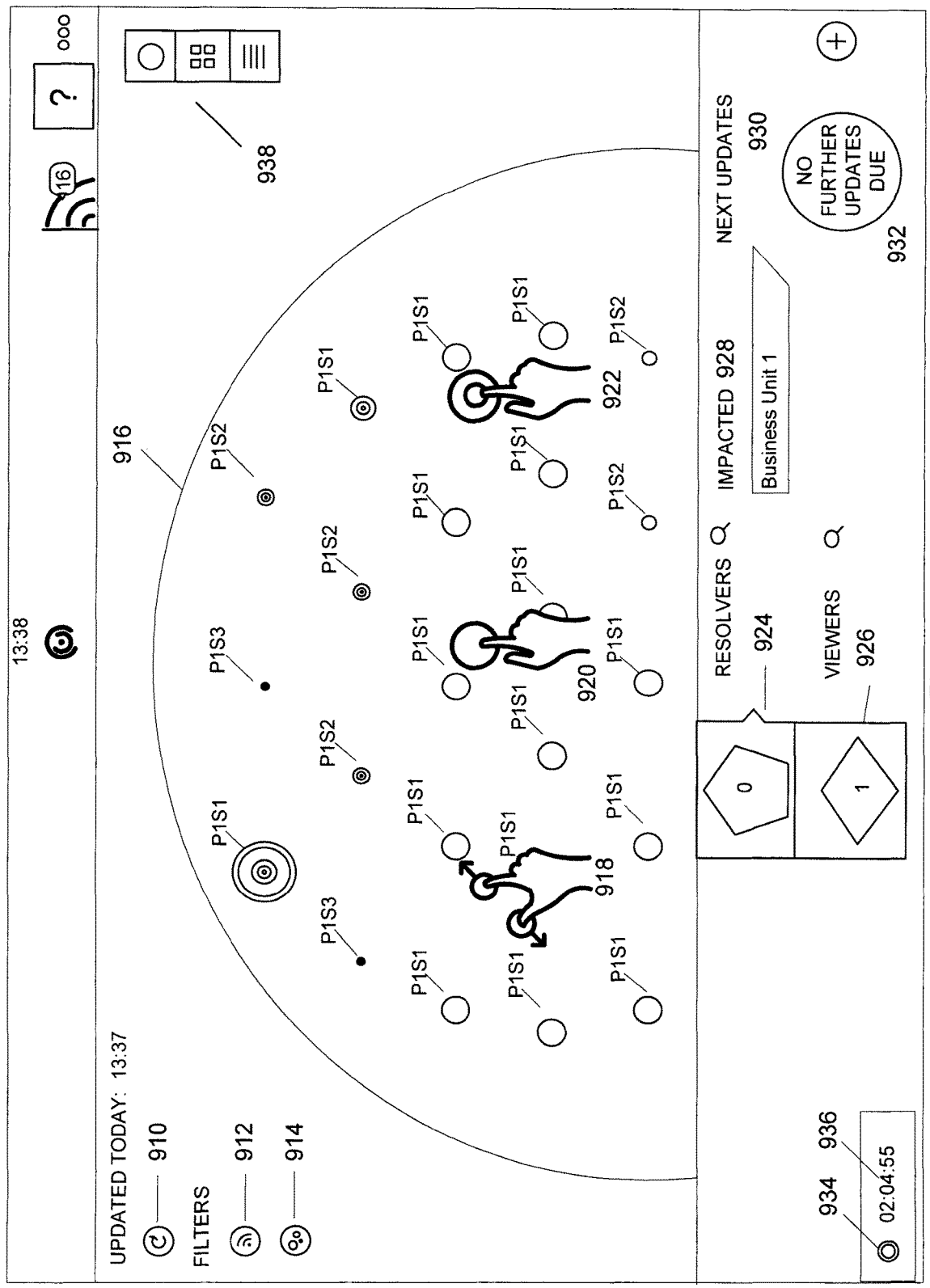
FIG. 9 is an exemplary interface illustrating an orb view for incidents, according to an embodiment of the present invention.

FIG. 9 is an exemplary interface illustrating an orb view for incidents, according to an embodiment of the present invention. A manual refresh icon may provide the user the ability to manually refresh the incident dashboard at 910 with updated information. Filters may be displayed for subscribed incidents 912 or all incidents 914. An orb view may be represented by 916. Various incidents may be graphically displayed. In this example, more important incidents may be displayed as being larger, or more prominent. In addition, color may be used to convey status where red may represent an active problem while green may represent a resolved incident. Other colors, representations and/or graphics may be used to convey varying degrees of information. A user may pinch and zoom while in orb view, as shown by 918. The user may tap (or otherwise interact with) an incident orb for more details, as shown by 920. Also, by double tapping (or performing another interaction), the user may view full details for a particular orb, as shown by 922.

The number of resolvers working on the incident may be displayed at 924. Also, the number of users viewing the incident may be provided via the interface, at 926. The numbers may represent current resolves or current viewers. The numbers may also represent total number of resolves or viewers. Impacted business units may be shown, at 928. The user may also have the option to view full incident details, at 930. Update status is provided at 932.

Incident status may be show by a color coded icon, at 934. Other graphics may be used. The time elapsed since the initial detection may be displayed at 936. Various messages may be associated with a particular incident.

Other views may be provided, such as grid view and list view, as shown by 938. Other options may be provided.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by Processor 104 may be stored and cataloged in Database 140 which may comprise or interface with a searchable database. Database 140 may comprise, include or interface to a relational database. Other databases, such as a query format database, a Standard Query Language (SQL) format database, a storage area network (SAN), or another similar data storage device, query format, platform or resource may be used. Database 140 may comprise a single database or a collection of databases, dedicated or otherwise. In one embodiment, Database 140 may store or cooperate with other databases to store the various data and information described herein. In some embodiments, Database 140 may comprise a file management system, program or application for storing and maintaining data and information used or generated by the various features and functions of the systems and methods described herein. In some embodiments, Database 140 may store, maintain and permit access to participant information, transaction information, account information, and general information used to process transactions as described herein. In some embodiments, Database 140 is connected directly to Processor 104, which, in some embodiments, it is accessible through a network, such as communication network, e.g., 122 and 124 illustrated in FIG. 1, for example.

Communications network, e.g., 122 and 124, may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network, e.g., 122 and 124, may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 122 and 124, may comprise a satellite communications network, such as a direct broadcast communication system (DBS) having the requisite number of dishes, satellites and transmitter/receiver boxes, for example. Communications network, e.g., 122 and 124, may also comprise a telephone communications network, such as the Public Switched Telephone Network (PSTN). In another embodiment, communication network 122 and 124 may comprise a Personal Branch Exchange (PBX), which may further connect to the PSTN.

In some embodiments, Processor 104 may include any mobile devices (e.g., mobile phone, smart phone, tablet, etc.) or terminal (e.g., a typical home or personal computer system, telephone, personal digital assistant (PDA) or other like device) whereby a user may interact with a network, such as communications network, e.g., 122 and 124, for example, that is responsible for transmitting and delivering data and information used by the various systems and methods described herein.

Mobile device may be a mobile communications device, a smartphone, a tablet computer, a wearable computer such as in the form of a wristwatch, bracelet, or computerized glasses (including a head-up display), a cellular phone, a mobile phone, a personal digital assistant, a computer, a handheld multimedia device, a personal media player, a mobile television, or other computing devices capable of receiving data transmissions. Mobile device is preferably capable of receiving user input, such as in the form of a touch input, or input using a stylus, mouse, keypad, trackpad, keyboard, gesture input not using touch, motion input, voice input, or buttons, for example.

Processor 104 may include, for instance, a personal or laptop computer, a telephone, or PDA. Processor 104 may include a microprocessor, a microcontroller or other general or special purpose device operating under programmed control. Processor 104 may further include an electronic memory such as a random access memory (RAM) or electronically programmable read only memory (EPROM), flash storage, a storage such as a hard drive, a CDROM or a rewritable CDROM or another magnetic, optical or other media, and other associated components connected over an electronic bus, as will be appreciated by persons skilled in the art. Processor 104 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Processor 104 may also include a network-enabled appliance, a browser-equipped or other network-enabled cellular telephone, or another TCP/IP client or other device. Wireless networks, such as WiFi, for example, may be used.

As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented method for managing incident notification, wherein the method is executed by a computer processor which communicates with a user via a network, the method comprising the steps of:

receiving an electronic notice of an incident associated with an entity at an electronic input of the computer processor;

automatically classifying, using the computer processor, the incident into a category comprising two distinct components, one representing an incident priority and the other representing a severity of the incident, the automatic classification being based at least in part on a set of historical information maintained by a database associated with the computer processor;

providing, using the computer processor, information concerning the incident to a graphical user interface accessible by a plurality of users via the network based on subscription information associated with each user, wherein the graphical user interface is interactive in that it allows users the ability to perform at least one of join a call regarding the incident, notify one or more other users regarding the incident, modify alert frequency notification for the incident, and view additional update details through activating an update information node;

receiving, by the computer processor, user feedback data from the interactive graphical user interface concerning the incident;

monitoring, using the computer processor, the incident to generate status information;

determining, using the computer processor, the users who are working on the incident based on the user feedback;

confirming that the users working on the incident are the correct users who should be working on the incident based on the set of historical information;

monitoring one or more of internal and external social media sources to ascertain an early indication of a potential incident;

identifying a population group impacted by the potential incident; and automatically updating the interactive graphical user interface of the computer processor based on the status information and the user feedback data concerning the incident;

the interactive graphical user interface further provides a broadcast message portion that displays general information intended for all users and an executive summary that displays details based on each user's role and permission; the interactive graphical user interface further provides an impacted business units portion that identifies each impacted business unit with a corresponding severity indicator; the interactive graphical user interface further provides a listing of resolvers, a listing of viewers and a graphical status update indicator;

wherein the interactive graphical user interface provides a single view of the broadcast message portion, the executive summary, the impacted business units portion, the listing of resolvers, the listing of viewers and the graphical status update indicator.

2. The method of claim 1, wherein the subscription information is automatically based on the user's role at the entity.

3. The method of claim 1, wherein the user interface further comprises a one-touch communication option.

4. The method of claim 1, wherein the information provided to the user interface further obfuscates sensitive details based on one or more of the following: when a user has not presented security credentials and when the user has not interacted with the user interface over a predetermined period of time.

5. The method of claim 1, wherein the incident is further classified according to sensitivity credentials.

6. The method of claim 1, further comprising the steps of:
tracking a prior history of resolution of past incidents relevant to the incident; and
identifying one or more individuals skilled in the resolution of the incident.

7. The method of claim 1, further comprising the step of:
customizing one or more notifications of the incident based on feedback from one or more other viewers.

8. A system, comprising:
a processor; and
a memory comprising computer-readable instructions which when executed by the processor cause the processor to perform the steps comprising:
receiving a notice of an incident associated with an entity;
classifying the incident into a category comprising two distinct components, one representing an incident priority and the other representing a severity of the incident, the automatic classification being based at least in part on a set of historical information maintained by a database associated with the computer processor;
providing information concerning the incident to a graphical user interface accessible by a plurality of users based on subscription information associated with each user, wherein the graphical user interface is interactive in that it allows users the ability to perform at least one of join a call regarding the incident, notify one or more other users regarding the incident, modify alert frequency notification for the incident, and view additional update details through activating an update information node;
receiving user feedback data from the interactive graphical user interface concerning the incident;
monitoring the incident to generate status information;
determining, using the computer processor, the users who are working on the incident based on the user feedback;
confirming that the users working on the incident are the correct users who should be working on the incident based on the set of historical information;
monitoring one or more of internal and external social media sources to ascertain an early indication of a potential incident;
identifying a population group impacted by the potential incident; and updating the user interface based on the status information and the user feedback data concerning the incident;
the interactive graphical user interface further provides a broadcast message portion that displays general information intended for all users and an executive summary that displays details based on each user's role and permission; the interactive graphical user interface further provides an impacted business units portion that identifies each impacted business unit with a corresponding severity indicator; the interactive graphical user interface further provides a listing of resolvers, a listing of viewers and a graphical status update indicator;

wherein the interactive graphical user interface provides a single view of the broadcast message portion, the executive summary, the impacted business units portion, the listing of resolvers, the listing of viewers and the graphical status update indicator.

9. The system of claim 8, wherein the subscription information is automatically based on the user's role at the entity.

10. The system of claim 8, wherein the user interface further comprises a one-touch communication option.

11. The system of claim 8, wherein the information provided to the user interface further obfuscates sensitive details based on one or more of the following: when a user has not presented security credentials and when the user has not interacted with the user interface over a predetermined period of time.

12. The system of claim 8, wherein the incident is further classified according to sensitivity credentials.

13. The system of claim 8, wherein the processor further performs the steps of:
tracking a prior history of resolution of past incidents relevant to the incident; and
identifying one or more individuals skilled in the resolution of the incident.

14. An automated computer implemented method for managing incident notification, wherein the method is executed by a computer processor which communicates with a user via a network, the method comprising the steps of:
receiving an electronic notice of incident associated with an entity at an electronic input of the computer processor;
monitoring, using the computer processor, the incident for status updates;
determining, using the computer processor, the users who are working on the incident based on user feedback;
confirming that the users working on the incident are the correct users who should be working on the incident based on a set of historical information maintained by a database associated with the computer processor;
distributing, using the computer processor, information based on the status updates to an interactive graphical user interface accessible by a plurality of users via the network based on subscription information associated with each user;
receiving, at the computer processor, the user feedback data with respect to the interactive graphical user interface concerning the incident;
storing, via a data store using the computer processor, the user feedback data and the status updates; and
communicating, via the computer processor, additional information concerning the incident to one or more other users via the network;
the interactive graphical user interface further provides a broadcast message portion that displays general information intended for all users and an executive summary that displays details based on each user's role and permission; the interactive graphical user interface further provides an impacted business units portion that identifies each impacted business unit with a corresponding severity indicator; the interactive graphical user interface further provides a listing of resolvers, a listing of viewers and a graphical status update indicator;

wherein the interactive graphical user interface provides a single view of the broadcast message portion, the executive summary, the impacted business units portion, the listing of resolvers, the listing of viewers and the graphical status update indicator.

15. A method for managing incident notification with the aid of a digital computer, comprising:

receiving, at the digital computer, an electronic notice of an incident associated with an entity;

monitoring in the digital computer, the incident for status updates;

determining, in the digital computer, the users who are working on the incident based on user feedback;

confirming that, in the digital computer, the users working on the incident are the correct users who should be working on the incident based on a set of historical information maintained by a database associated with the computer processor;

distributing, by the digital computer, information based on the status updates to an interactive user interface accessible by a plurality of users based on subscription information associated with each user;

receiving, at the interactive user interface of the digital computer, the user feedback data concerning the incident;

storing at a data store using the digital computer, the user feedback data and the status updates; and repetitively communicating by the digital computer, additional information concerning the incident to one or more other users;

the interactive user interface further provides a broadcast message portion that displays general information intended for all users and an executive summary that displays details based on each user's role and permission; the interactive user interface further provides an impacted business units portion that identifies each impacted business unit with a corresponding severity indicator; the interactive user interface further provides a listing of resolvers, a listing of viewers and a graphical status update indicator;

wherein the interactive graphical user interface provides a single view of the broadcast message portion, the executive summary, the impacted business units portion, the listing of resolvers, the listing of viewers and the graphical status update indicator.

\* \* \* \* \*